(12) United States Patent
Maciolek et al.

(10) Patent No.: US 12,430,955 B1
(45) Date of Patent: Sep. 30, 2025

(54) SYSTEM AND METHOD FOR VEHICLE COLLISION ANALYSIS

(71) Applicant: UIPCO, LLC, San Antonio, TX (US)

(72) Inventors: Michael J. Maciolek, Kerrville, TX (US); Donnette L. Moncrief Brown, San Antonio, TX (US); Manfred Amann, San Antonio, TX (US); Timothy Frank Davison, San Antonio, TX (US); Snehal Desai, Richardson, TX (US); Nicole Ferretti, Dallas, TX (US); Rachel Michelle Ballew, San Antonio, TX (US); Chung Shing Sheldon Lee, South Jordan, UT (US); Martin Lopez, Frisco, TX (US); Kelsey Anne O'Brien, Austin, TX (US); Melissa Jane Porter, Lutz, FL (US); Sayeef Rahim, Allen, TX (US); Eric David Schroeder, San Antonio, TX (US); Steven J. Schroeder, Oak Point, TX (US); Joseph Michael Vesco, Sparks, NV (US)

(73) Assignee: United Services Automobile Association (USAA), San Antonio, TX (US)

( * ) Notice: Subject to any disclaimer, the term of this patent is extended or adjusted under 35 U.S.C. 154(b) by 254 days.

(21) Appl. No.: 18/174,828

(22) Filed: Feb. 27, 2023

Related U.S. Application Data

(60) Provisional application No. 63/314,549, filed on Feb. 28, 2022.

(51) Int. Cl.
G07C 5/00 (2006.01)
G06F 13/36 (2006.01)
G07C 5/08 (2006.01)

(52) U.S. Cl.
CPC ............ *G07C 5/008* (2013.01); *G06F 13/36* (2013.01); *G07C 5/0808* (2013.01); *G06F 2213/40* (2013.01); *G07C 2205/02* (2013.01)

(58) Field of Classification Search
CPC .. G07C 5/008; G07C 5/0808; G07C 2205/02; G06F 13/36; G06F 2213/40
See application file for complete search history.

(56) References Cited

U.S. PATENT DOCUMENTS 10,906,494 B1 * 2/2021 Chan ................ B60R 21/01562

FOREIGN PATENT DOCUMENTS

CA 2900168 A1 * 2/2017 ........... G08B 25/016

* cited by examiner

*Primary Examiner* — Andrew J Cromer
(74) *Attorney, Agent, or Firm* — Plumsea Law Group, LLC

(57) ABSTRACT

A system and method for using wearable device data and data gathered from a vehicle's onboard sensors to provide a more accurate and/or robust set of information about an accident. In one embodiment, a smartwatch is connected to the CAN bus of a vehicle so that data can be transmitted between the watch and onboard sensors. In one embodiment, onboard vehicle sensors may detect a sudden deceleration indicating that an accident may have occurred. At the same time, data from an occupant of the vehicle can be used to confirm if the occupant experienced a sudden deceleration at the same time, indicating that a crash has occurred.

20 Claims, 5 Drawing Sheets

SYSTEM AND METHOD FOR VEHICLE COLLISION ANALYSIS

CROSS-REFERENCE TO RELATED APPLICATIONS

This application claims the benefit of Provisional Patent Application No. 63/314,549 filed Feb. 28, 2022, and titled "System and Method for Vehicle Collision Analysis," which is incorporated by reference herein in its entirety.

TECHNICAL FIELD

The present disclosure generally relates to systems and methods for sensing and analyzing data, and in particular to systems and methods for sensing and analyzing data during automobile collisions.

BACKGROUND

Motor vehicles may have various sensors for detecting collisions. These can include impact sensors, which may be attached at particular locations of a vehicle. Some vehicles may use cameras and/or radar to detect objects for use in collision warning systems that attempt to detect collisions before they occur. Faulty sensors, as well as dirt on forward or side facing cameras, can cause diagnostic systems to incorrectly identify when a collision has or has not occurred (or is about to occur).

There is a need in the art for a system and method that addresses the shortcomings discussed above.

SUMMARY

In one aspect, a method of improving the accuracy of detecting a collision for a motor vehicle using information from onboard sensors of the motor vehicle and using information from a wearable device worn by an occupant the motor vehicle includes steps of establishing a connection with a controller area network bus of the motor vehicle and receiving, from the controller area network bus, vehicle data sensed by one or more onboard vehicle sensors of the motor vehicle. The method further includes steps of analyzing the vehicle data and detecting a pattern in the vehicle data indicative of a collision during a selected period of time, retrieving wearable device data from one or more sensors of the wearable device, and using the wearable device data, with the vehicle data, to confirm if a collision has occurred during the selected period of time.

In another aspect, a system for improving the accuracy of detecting a collision for a motor vehicle using information from onboard sensors of the motor vehicle and using information from a wearable device worn by an occupant the motor vehicle includes one or more processors and one or more storage devices storing instructions that are operable, when executed by the one or more processors, to cause the one or more processors to (1) establish a connection with a controller area network bus of the motor vehicle; (2) receive, from the controller area network bus, vehicle data sensed by one or more onboard vehicle sensors of the motor vehicle; (3) analyze the vehicle data and detect a pattern in the vehicle data indicative of a collision during a selected period of time; (4) retrieve wearable device data from one or more sensors of the wearable device; and (5) use the wearable device data, with the vehicle data, to confirm if a collision has occurred during the selected period of time.

In another aspect, a non-transitory computer-readable medium storing software comprising instructions executable by one or more processors which, upon such execution, cause the one or more processors to (1) establish a connection with a controller area network bus of a motor vehicle; (2) receive, from the controller area network bus, vehicle data sensed by one or more onboard vehicle sensors of the motor vehicle; (3) analyze the vehicle data and detect a pattern in the vehicle data indicative of a collision during a selected period of time; (4) retrieve wearable device data from one or more sensors of a wearable device; and (5) use the wearable device data, with the vehicle data, to confirm if a collision has occurred during the selected period of time.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide a system and method for using wearable device data and data gathered from a vehicle's onboard sensors to provide a more accurate and/or robust set of information about an accident. In one embodiment, a smartwatch is connected to the CAN bus of a vehicle so that data can be transmitted between the watch and onboard sensors.

In one embodiment, onboard vehicle sensors may detect a sudden deceleration indicating that an accident may have occurred. At the same time, data from an occupant of the vehicle can be used to confirm if the occupant experienced a sudden deceleration at the same time, indicating that a crash has occurred.

In another embodiment, data from one or more vehicle sensors could be combined with acceleration data from a smartwatch to better understand the trajectory of the vehicle during an accident and/or the trajectory of the occupant within the vehicle. This information could be used after the accident to help build an accurate recreation/model of the accident.

In another embodiment, when the sensors of a vehicle indicate that an accident may have occurred, data from the occupant's smartwatch can be used to check their vital signs, including, for example, heart rate and O2 levels. This data could then be sent to first responders. In cases where multiple occupants are in an accident and each is wearing a smartwatch, vital sign data for each occupant could be sent to first responders so that the first responders know in advance which occupants are most in need of serious help.

Figure 1:
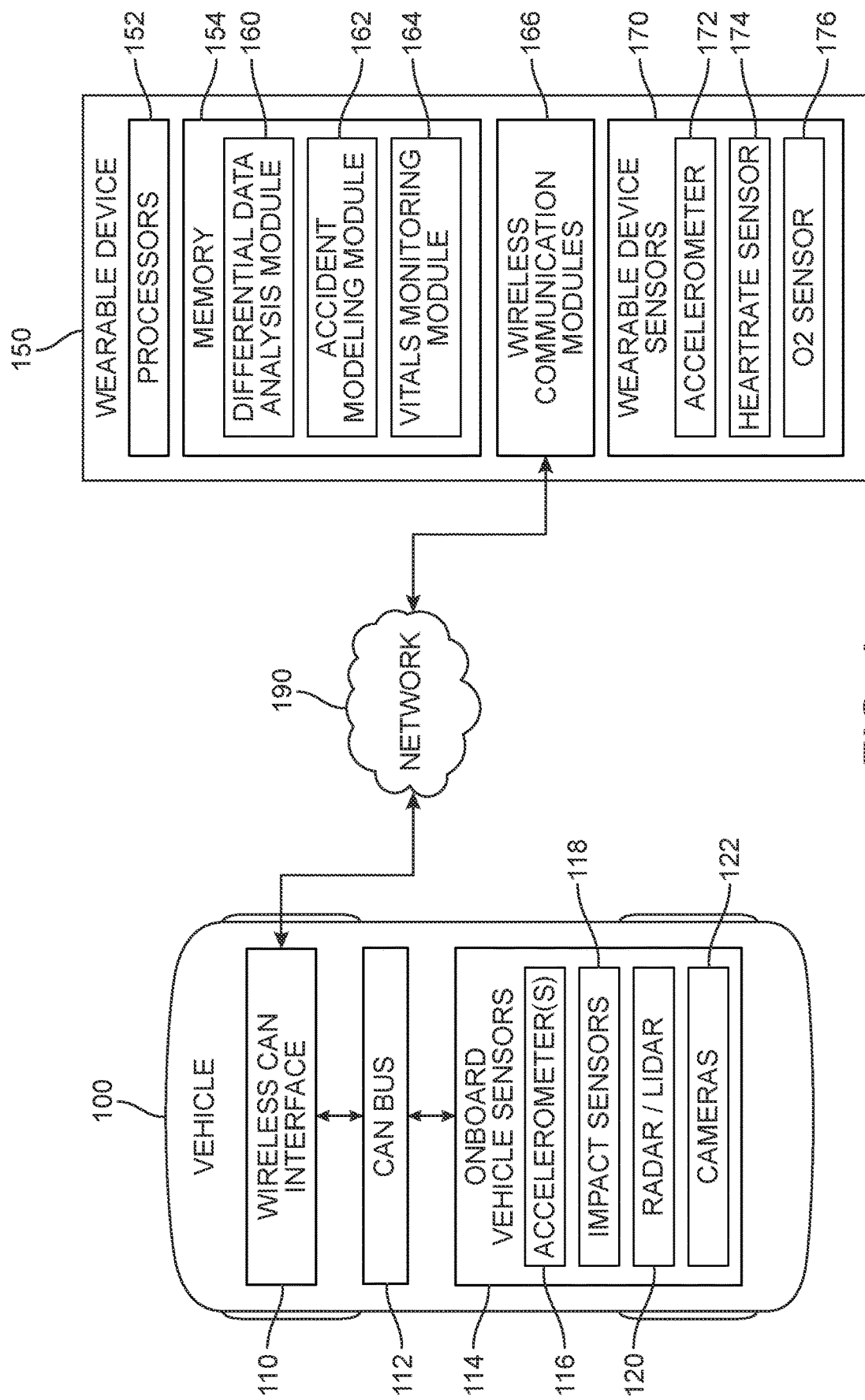
FIG. 1 is a schematic view of an architecture for robust data sensing and analysis for a motor vehicle, according to an embodiment.

FIG. 1 is a schematic view of a motor vehicle 100 and a wearable device 150, where the latter may be in communication with one or more components, devices, or systems, of the motor vehicle. For purposes of illustration, wearable device 150 is shown generically, but it may be appreciated that in different embodiments any suitable wearable device could be used including smart watches, smart bracelets, and smart rings. Additionally, when motor vehicle 100 is operated, wearable device 150 may be worn by an occupant of motor vehicle 100 (such as the driver or another passenger).

Motor vehicle 100 can include a controller area network bus 112 ("CAN bus 112"). CAN bus 112 can be configured to connect with a variety of different vehicle systems, including various kinds of electronic control units for different vehicle systems. In the exemplary embodiment, CAN bus 112 may connect to one or more onboard vehicle sensors 114.

Onboard vehicle sensors 114 can include, but are not limited to: accelerometers 116, impact sensors 118, radar and/or lidar sensors 120, and cameras 122. These sensors may be distributed throughout the vehicle and placed in suitable locations for best detecting/predicting various types of collisions, including forward, rearward, and side collisions. Other suitable sensors could include acceleration pedal sensors, vehicle speed sensors, braking sensors, steering angle sensors, and other kinds of sensors that can be used to infer the speed and trajectory of a vehicle.

CAN bus 112 can also connect to a wireless CAN interface 110, which provides a way to connect wireless devices or systems to the CAN bus.

Wearable device 150 may include processors 152 and memory 154. The processors could be any suitable processors for a wearable device. Memory 154 may be any suitable non-transitory medium that can store instructions that are executable by processors 152.

Wearable device 150 may include one or more wearable device sensors 170. These can include, but are not limited to: an accelerometer 172, a heartrate sensor 174, and an oxygen sensor 176. Other sensors that could be incorporated into a wearable device, such as a smartwatch, include, but are not limited to: proximity sensors, light sensors, ECG sensors, perspiration sensors, as well as other suitable sensors.

Wearable device 150 may also include one or more wireless communication modules 166. These may include, for example, networking cards with radios for communicating over WiFi networks, Bluetooth networks, cellular networks, or any other suitable networks. As seen in FIG. 1, wireless communication modules 166 of wearable device 150 may communicate with wireless CAN interface 110 of motor vehicle 100 over network 190. Network 190 may be any suitable network such as a WiFi network, any suitable local area network and/or any suitable personal area network.

Wearable device 150 may include a variety of software modules stored in memory 154, which may be used for analyzing data captured by wearable device sensors 170, and/or information from other sensors that may be received over network 190. These may include a differential data analysis module 160, an accident modeling module 162, and a vitals monitoring module 164.

As described in further detail below, differential data analysis module 160 (or simply "analysis module 160") includes sub modules and components for analyzing sensed wearable device data along with sensed vehicle data. Accident modeling module 162 may be used to provide a model of an accident using both data from vehicle sensors and data from a wearable device. Vitals monitoring module 164 may be used to monitor vital signs of the body, such as a wearer's heartrate, oxygen levels, and motion/acceleration, especially during and after a detected collision.

Figure 2:
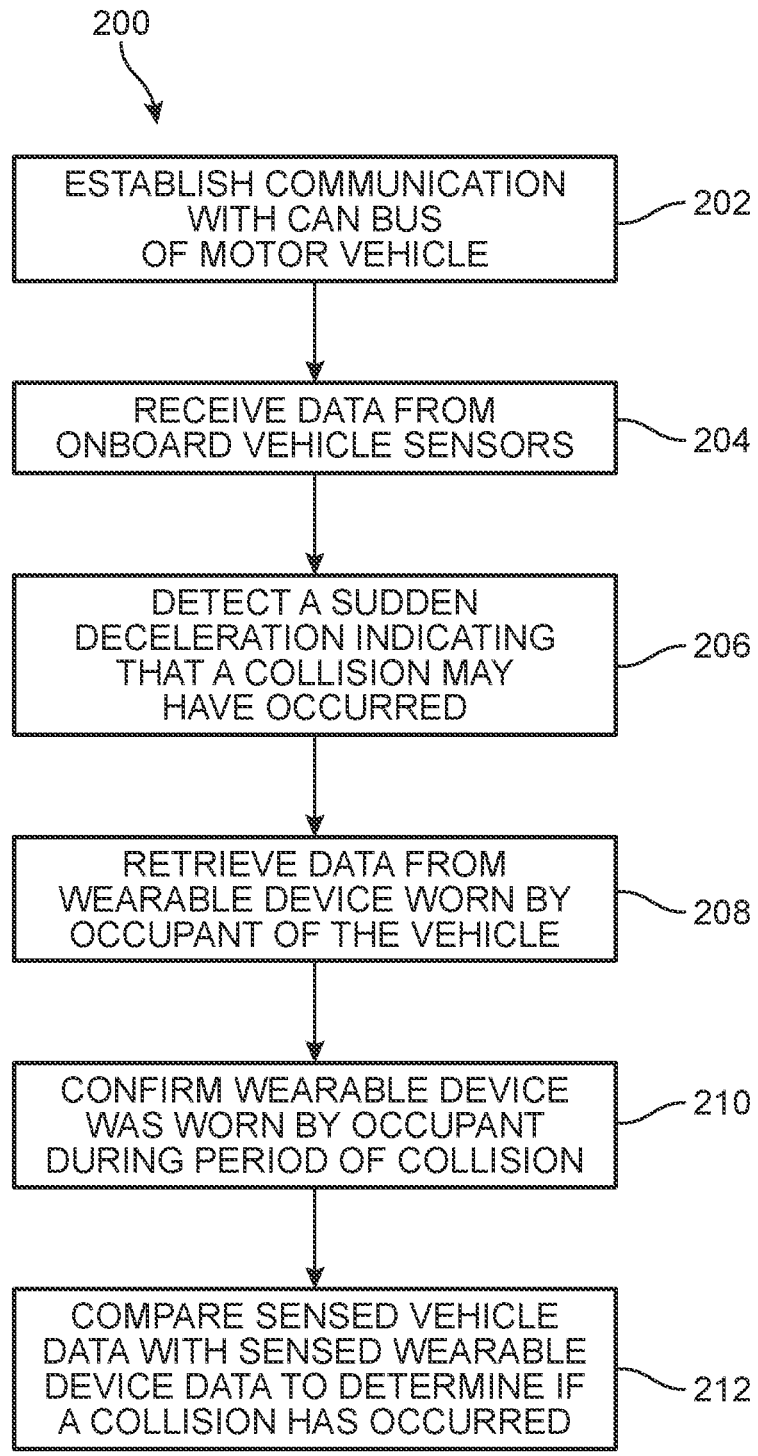
FIG. 2 is a schematic view of a method of detecting a collision for a motor vehicle, according to an embodiment.

FIG. 2 is a schematic view of a process 200 for detecting a collision using data from a vehicle and data from a wearable device, according to an embodiment. In some embodiments, one or more of the following steps could be performed by an analysis module of a wearable device (for example, analysis module 160 of FIG. 1). Referring to FIG. 2, in a first step 202, analysis module 160 may establish communication with the CAN bus of a motor vehicle. This may occur whenever a motor vehicle is turned on and an occupant in the motor vehicle is wearing a wearable device, such as a smart watch, which runs analysis module 160.

Next, in step 204, analysis module 160 may receive data from one or more onboard sensors, via its network connection to the CAN bus. This data could include accelerometer data, data from one or more impact sensors, data from cameras, or any other suitable data from any vehicle sensors, including the various vehicle sensors discussed above.

In step 206, analysis module 160 may detect a sudden deceleration indicating that a collision may have occurred. Next, in step 208, analysis module 160 may retrieve data from sensors on the wearable device that is worn by an occupant of the motor vehicle. For example, analysis module 160 could retrieve acceleration data from the accelerometer.

In step 210, analysis module 160 confirms that the wearable device is indeed being worn by an occupant of the vehicle during the detected period of collision. For example, an occupant could enter a car wearing a smart watch, but remove the smart watch before the collision. In this case, the system can determine that the smart watch was not being worn at the time of the collision (for example, by analyzing data from a light sensor, or by querying the smart watch's operating system to determine if and when the smart watch was removed.

Once it is determined that the occupant was wearing the wearable device at the time of the collision, analysis module 160 can proceed to step 212. In step 212, analysis module 160 may compare the sensed vehicle data (for example, data from impact sensors and/or accelerometers) with the sensed wearable data. More specifically, analysis module 160 may use the sensed vehicle data to determine if a collision may have occurred, and then use both the sensed vehicle data and the sensed wearable device data to provide a more robust classification of the data as indicative of a collision or not indicative of a collision.

Figure 3:
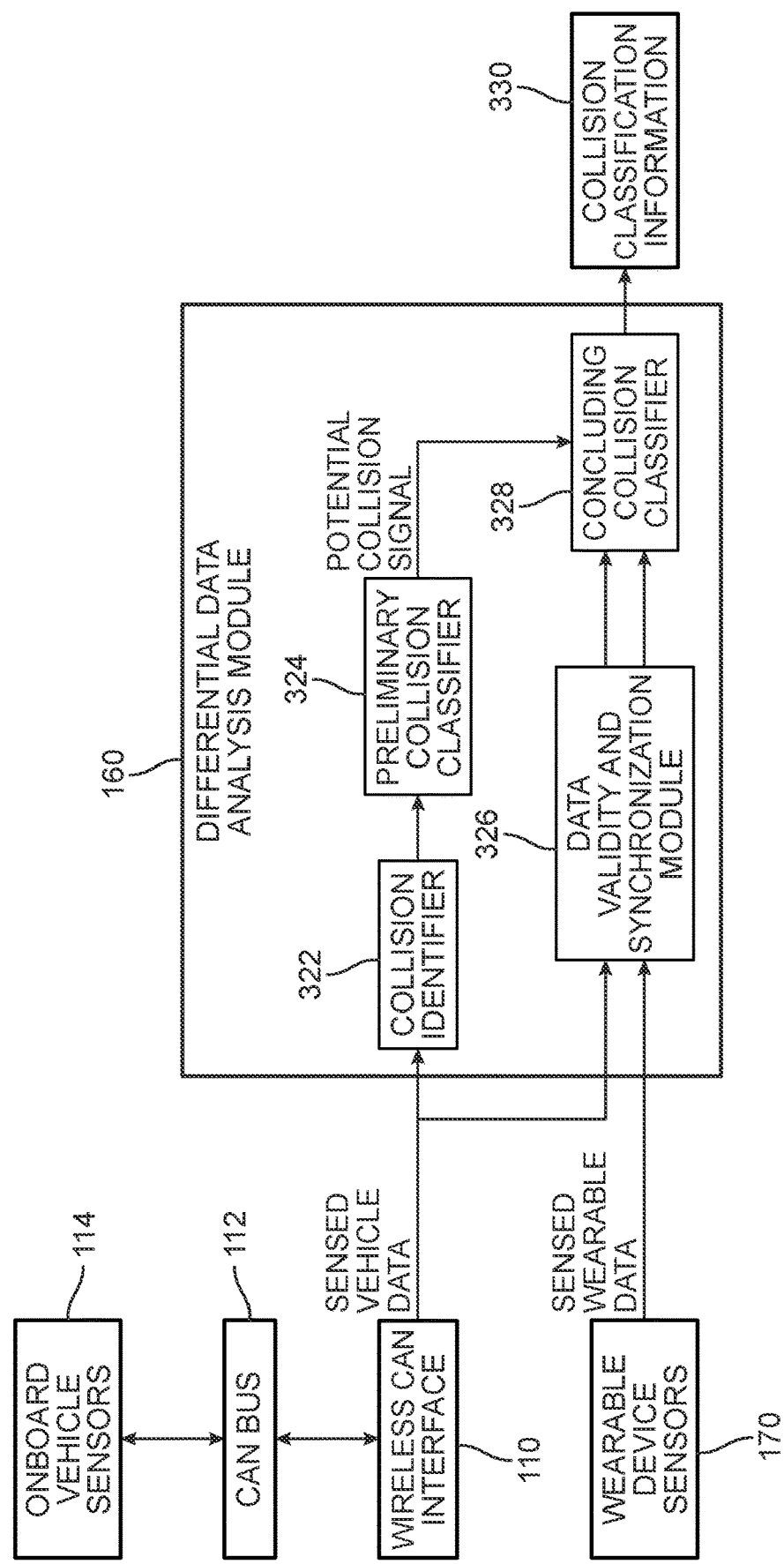
FIG. 3 is a schematic view of a differential data analysis module, according to an embodiment.

FIG. 3 is a schematic view of a particular architecture for differential data analysis module 160, according to an embodiment. Inputs to analysis module 160 can include sensed vehicle data, which comes from onboard vehicle sensors 114, and is passed to analysis module 160 by way of CAN bus 112 and wireless CAN interface 110. Analysis module 160 may also receive sensed wearable data from wearable device sensors 170. In the exemplary embodiment, analysis module 160 is stored on, and wearable device sensors 170 are located within, a wearable device, such as a smart watch.

Analysis module 160 may comprise various modules, and other components for monitoring and classifying sensed vehicle data and sensed wearable data to determine if a collision has occurred. These can include a collision identifier 322, a preliminary collision classifier 324, a data validity and synchronization module 326, and a concluding collision classifier 328.

Collision identifier 322 may be configured to detect sensed vehicle data and identify the starting point for a potential collision. For example, collision identifier 322 could identify the begging of a potential collision based on information from impact sensors. Also, collision identifier 322 could identify the beginning of a potential collision, by analyzing data from an accelerometer. For example, if the accelerometer data shows a sudden deceleration, this may be indicative of a potential collision. As another example, sudden braking (from braking sensors) or sudden drops in vehicle speed (from vehicle speed sensors) could be indicative of a potential collision.

Collision identifier 322 may look for sudden changes in data, and may use thresholds to distinguish potential collisions from normal operating conditions of the vehicle. Because threshold analysis may be fairly crude at detecting if an accident has occurred, collision identifier 322 may primarily serve as a first step in analyzing data to determine if a collision has occurred.

Preliminary collision classifier 324 can be used to classify data that is passed by collision identifier 322. For example, if collision identifier 322 detects a sudden drop in vehicle speed, the vehicle speed information and/or other suitable sensed vehicle information can be passed to preliminary collision classifier 324 for further analysis. Whereas collision identifier 322 may primarily use threshold analysis for detection potential collisions, preliminary collision classifier 324 may use more sophisticated analyses including various kinds of machine learning models that can be trained with data. Exemplary classifiers that could be used include, but are not limited to decision trees, naïve bayes classifiers, neural networks, and support vector machines. That is, collision classifier 324 may be trained to classify historical sensed vehicle data as indicative of a collision or not indicative of a collision. The output classification can then be sent to other systems, such as concluding collision classifier 328, as described below.

Data validity and synchronization module 326 (or simply "data module 326") can receive both sensed vehicle data and sensed wearable data. Data module 326 can provide at least two functions. First, data module 326 can confirm the validity of any received data. In one embodiment, for example, data module 326 may check that and sensed wearable data was recorded while the wearable device was being worn by an occupant of the vehicle. For example, data module 326 may confirm that a smart watch was worn while the occupant was in the vehicle using information from a light sensor on the watch, or by querying the operating system of the wearable device where such information may be stored. Data module 326 may also confirm that the occupant wearing the smart watch was located within the vehicle at the time of the potential collision. This could be done by checking the GPS location of the vehicle (via information from onboard vehicle sensors 114 or communication with an onboard unit of the vehicle through CAN bus 112) against the GPS location of the wearable device, at a time period corresponding to the potential collision.

Data module 326 may also act to synchronize the sensed vehicle data and the sensed wearable data for analysis. In particular, once a potential collision has been indicated by preliminary collision classifier 324, the approximate period of time for the collision can be retrieved. Data module 326 may then modify the data streams (or batch data) being fed into concluding collision classifier 328 so that both correspond to data taken during the same period of time when the collision potentially occurred.

Concluding collision classifier 328 may comprise another machine learning classifier that can be trained to classify data as indicative of a collision or not indicative of a collision. By contrast with preliminary collision classifier, however, concluding collision classifier 328 uses both sensed vehicle data and sensed wearable data as input. Using the sensed wearable data in addition to the sensed vehicle data provides a more robust method of classifying the data and predicting whether a collision has or has not occurred.

The output of concluding collision classifier 328 may be collision classification information 330. This information can be used to make additional decisions, such as a decision to model a collision, and a decision to monitor vitals of an occupant following a detected collision.

In operation, sensed vehicle data is passed to analysis module 160. The data is first analyzed by collision identifier 322, which may use thresholds or other rules for identifying potential collisions, including the start of the collisions. Using collision identifier 322 upstream of preliminary collision classifier may streamline the classification process by reducing how frequently preliminary collision classifier 324 must run. For example, if no pre-screening/identification is done, preliminary collision classifier 324 may have to continuously analyze and classify all incoming data. This is inefficient since most of the time there is not a collision, so collision classification of "normal driving" data would eat up processing resources and energy of a wearable device.

Preliminary collision classifier 324 determines, by classifying sensed vehicle data in the time period indicated by collision identifier 322, if a collision may have occurred. If not, preliminary collision classifier 324 takes no further action and waits for more data to analyze from collision identifier 322. If collision classifier 324 determines that a collision may have occurred, a potential collision signal is sent to concluding collision classifier 326. Concluding classifier 326 then makes a final classification, using both sensed vehicle data and sensed wearable data.

The exemplary embodiment describes a system where a first classifier uses only sensed vehicle data as a preliminary classification, to determine if a collision has potentially occurred. A second classifier then uses both sensed vehicle data and sensed wearable data to provide a more robust collision classification. In another embodiment, a first collision classifier may be trained to detect if a collision has occurred, while a second collision classifier can be trained to detect the type of collision that has occurred. As used herein, the type of collision may include, but is not limited to, a forward impact collision, a side impact collision, and a rear impact collision. Classifications may also include labels for collisions intermediate to these three standard types of collisions. For example, one type of collision could be a collision that is at a forty-five-degree angle between a forward collision and a side collision. Collisions could also be classified according to passenger side or driver side collisions.

Using wearable data to complement vehicle data, it may be possible to generate more accurate models of an accident compared to what can be done using only vehicle data.

Figure 4:
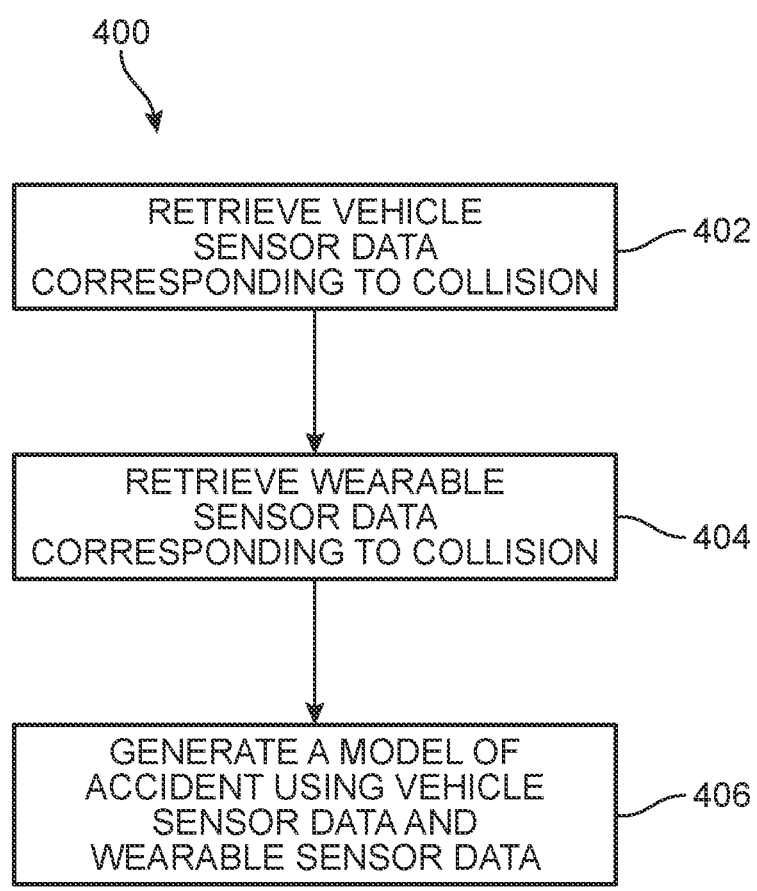
FIG. 4 is a schematic view of a method of generating a model of an accident using vehicle data and wearable device data, according to an embodiment.

FIG. 4 is a schematic view of a process 400 for generating a model of an accident using both vehicle sensor data and wearable sensor data. In some embodiments, one or more of these steps could be performed by accident modeling module 162. Starting in step 402, vehicle sensor data corresponding to a collision could be retrieved. In step 404, wearable sensor data corresponding to the time period of the collision could be retrieved. In step 406, accident modeling module 162 could generate a model of the accident using the retrieved data.

During an accident, vehicle sensors may be used to detect impacts, sudden accelerations, as well as yaw rate (using an onboard yaw rate sensor). This data can be used to recreate a model of the accident. The model can show likely collision scenarios consistent with the sensed data. Wearable sensors can provide additional information for this type of analysis. In particular, while many vehicle sensors have fixed relative positions due to the rigid frame of the body, an occupant's body may move more independently during a collision, thereby providing additional data that can be analyzed and used to constrain models/possible collision scenarios.

Embodiments can include provisions for monitoring the vital signs of occupants using a wearable device in the event that a collision has been detected using a combination of vehicle and wearable device data.

Figure 5:
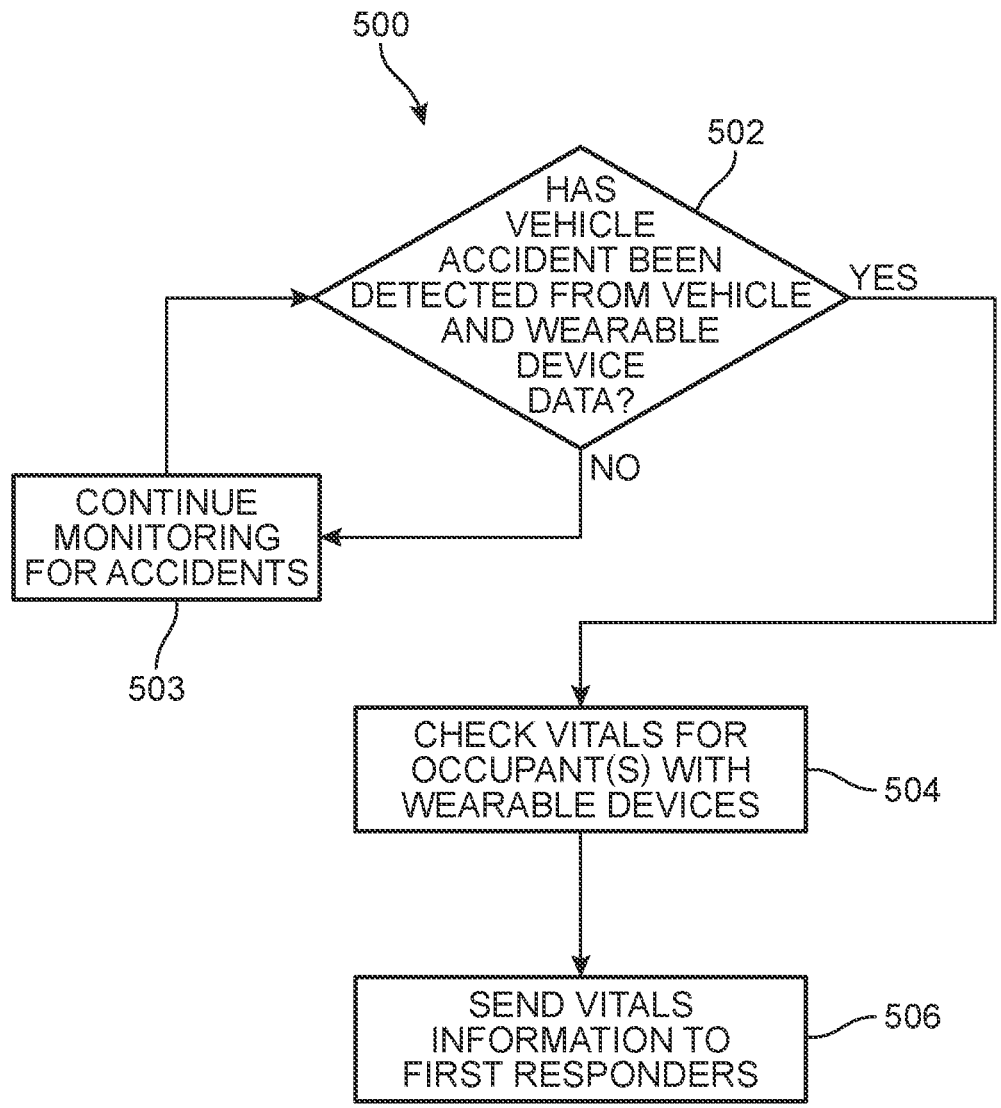
FIG. 5 is a schematic view of a method of detecting a collision and monitoring vitals for an occupant of a vehicle in response to detecting the collision, according to an embodiment.

FIG. 5 is a schematic view of a process 500 for monitoring vital signs of a vehicle occupant and sending the vital information to first responders is response to detecting a collision. In some embodiments, one or more of the following steps could be performed by vitals monitoring module 164.

Starting in step 502, monitoring module 164 may determine if a vehicle accident (or collision) has been detected from vehicle and wearable device data. This can be done by querying differential data analysis module 162, which makes determinations about collisions. If no accident has occurred, monitoring module 164 may proceed to step 503 to continue monitoring for accidents, and then return to step 502.

If, in step 502, monitoring module 164 determines that an accident has been detected, monitoring module 164 may proceed to step 504. In step 504, monitoring module 164 checks the vitals of any occupants with wearable devices. In particular, monitoring module 164 may receive heartrate information, oxygen information, ECG information, or any other suitable information that is sensed by the wearable device.

In step 506, the vitals information can be sent to first responders. This allows the first responders to anticipate the health status of the occupant(s) prior to arriving on the scene, so that they can prioritize those who may be in the most critical condition.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of improving accuracy of detecting a collision for a motor vehicle using information from onboard sensors of the motor vehicle and using information from a wearable device worn by an occupant the motor vehicle, comprising:

using a differential data analysis module running on a processor in the wearable device to:

establish a connection between the wearable device and a controller area network bus of the motor vehicle;

receive at the wearable device, from the controller area network bus, vehicle generated data sensed by one or more onboard vehicle sensors in the motor vehicle that are in communication with the controller area network bus;

analyze the vehicle data and detect a pattern in the vehicle data indicative of a collision during a selected period of time;
retrieve wearable device generated data from one or more sensors in the wearable device; and
use the wearable device generated data, with the vehicle generated data, to confirm if a collision has occurred during the selected period of time.

2. The method according to claim 1, wherein the method further includes a step of confirming that the wearable device is worn by the occupant during the selected period of time.

3. The method according to claim 1, wherein the method further includes using a first classifier in the differential data analysis module to detect the pattern and output a potential collision signal.

4. The method according to claim 3, wherein the differential data analysis module uses a collision identifier to filter the vehicle generated data before the vehicle generated data are processed by the first classifier.

5. The method according to claim 3, wherein the method further includes using a second classifier in the differential data analysis module to classify the vehicle generated data and the wearable device generated data in response to receiving the potential collision signal.

6. The method according to claim 5, wherein the method further includes using a synchronization module running on the processor in the wearable device to synchronize the vehicle generated data and the wearable device generated data for the second classifier.

7. The method according to claim 1, wherein the method further includes generating a model of the collision on the processor in the wearable device using the vehicle generated data and the wearable device generated data.

8. The method according to claim 1, wherein the method further includes checking vital sign data for the occupant using the one or more sensors of the wearable device in response to detecting the collision.

9. The method according to claim 8, wherein the method further includes sending the vital sign data to a first responder.

10. A system for improving accuracy of detecting a collision for a motor vehicle using information from onboard sensors of the motor vehicle and using information from a wearable device worn by an occupant the motor vehicle, comprising:
one or more processors and one or more storage devices on the wearable device storing instructions that are operable, when executed by the one or more processors, to cause the one or more processors to:
run a differential data analysis module on the one or more processors in the wearable device to:
establish a connection between the wearable device and a controller area network bus of the motor vehicle;
receive at the wearable device, from the controller area network bus, vehicle generated data sensed by one or more onboard vehicle sensors in the motor vehicle that are in communication with the controller area network bus;
analyze the vehicle data and detect a pattern in the vehicle data indicative of a collision during a selected period of time;
retrieve wearable device generated data from one or more sensors in the wearable device; and
use the wearable device generated data, with the vehicle generated data, to confirm if a collision has occurred during the selected period of time.

11. The system according to claim 10, wherein the one or more vehicle sensors includes an accelerometer.

12. The system according to claim 10, wherein the one or more sensors of the wearable device includes an accelerometer.

13. The system according to claim 10, wherein the instructions are further executable to confirm that the wearable device is worn by the occupant during the selected period of time.

14. The system according to claim 10, wherein the instructions are further executable to use a first classifier in the differential data analysis module to detect the pattern and output a potential collision signal.

15. The system according to claim 14, wherein the differential data analysis module uses a collision identifier to filter the vehicle generated data before the vehicle generated data are processed by the first classifier.

16. A non-transitory computer-readable medium storing software comprising instructions executable by one or more processors which, upon such execution, cause the one or more processors to:
use a differential data analysis module running on a processor in the wearable device to:
establish a connection between the wearable device and a controller area network bus of the motor vehicle;
receive at the wearable device, from the controller area network bus, vehicle generated data sensed by one or more onboard vehicle sensors in the motor vehicle that are in communication with the controller area network bus;
analyze the vehicle data and detect a pattern in the vehicle data indicative of a collision during a selected period of time;
retrieve wearable device generated data from one or more sensors in the wearable device; and
use the wearable device generated data, with the vehicle generated data, to confirm if a collision has occurred during the selected period of time.

17. The non-transitory computer-readable medium according to claim 16, wherein the instructions are further executable to confirm that the wearable device is worn by an occupant of the motor vehicle during the selected period of time.

18. The non-transitory computer-readable medium according to claim 16, wherein the instructions are further executable to use a first classifier in the differential data analysis module to detect the pattern and output a potential collision signal.

19. The non-transitory computer-readable medium according to claim 18, wherein the differential data analysis module uses a collision identifier to filter the vehicle generated data before the vehicle generated data are processed by the first classifier.

20. The non-transitory computer-readable medium according to claim 18, wherein the instructions are further executable to use a second classifier in the differential data analysis module to classify the vehicle generated data and the wearable device generated data in response to receiving the potential collision signal.

* * * * *